(12) United States Patent
Sumida et al.

(10) Patent No.: US 8,043,000 B2
(45) Date of Patent: Oct. 25, 2011

(54) RESONANCE TAG WITH TEMPERATURE SENSOR

(75) Inventors: Takayuki Sumida, Kawasaki (JP); Tadahiko Hirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 131 days.

(21) Appl. No.: 12/563,993

(22) Filed: Sep. 21, 2009

(65) Prior Publication Data

US 2010/0001745 A1   Jan. 7, 2010

Related U.S. Application Data

(62) Division of application No. 11/945,259, filed on Nov. 26, 2007, now Pat. No. 7,607,829.

(30) Foreign Application Priority Data

Dec. 6, 2006  (JP) .................................. 2006-329620

(51) Int. Cl.
*G01K 7/00* (2006.01)
*G01K 11/00* (2006.01)
*G01K 3/00* (2006.01)

(52) U.S. Cl. ........................ 374/184; 374/102; 374/117
(58) Field of Classification Search ................ 374/102, 374/117, 184
See application file for complete search history.

(56) References Cited

U.S. PATENT DOCUMENTS

| 2006/0108416 A1 | 5/2006 | Hirai |
| 2006/0125637 A1 | 6/2006 | Hirai et al. |
| 2008/0012580 A1 | 1/2008 | Funo et al. |
| 2008/0088456 A1 | 4/2008 | Sumida et al. |

FOREIGN PATENT DOCUMENTS

| JP | 2004-144683 A | 5/2004 |
| JP | 2004-245607 A | 9/2004 |

*Primary Examiner* — Lisa Caputo
*Assistant Examiner* — Mirellys Jagan
(74) *Attorney, Agent, or Firm* — Fitzpatrick, Cella, Harper & Scinto

(57) ABSTRACT

A temperature-history sensor includes a resonance circuit composed of at least a capacitor and a coil. The temperature-history sensor has a display for indicating a predetermined set temperature of the temperature-history sensor. The capacitor has at least a thermofusion material between electrodes of the capacitor, and the melting point of the thermofusion material is in the region of the set temperature.

1 Claim, 15 Drawing Sheets

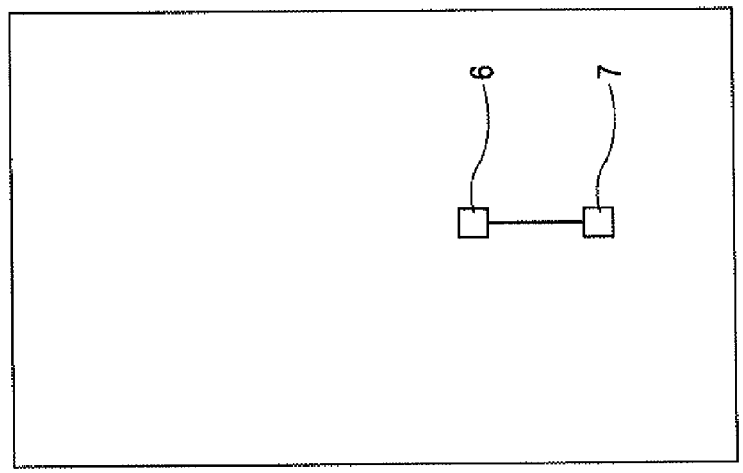
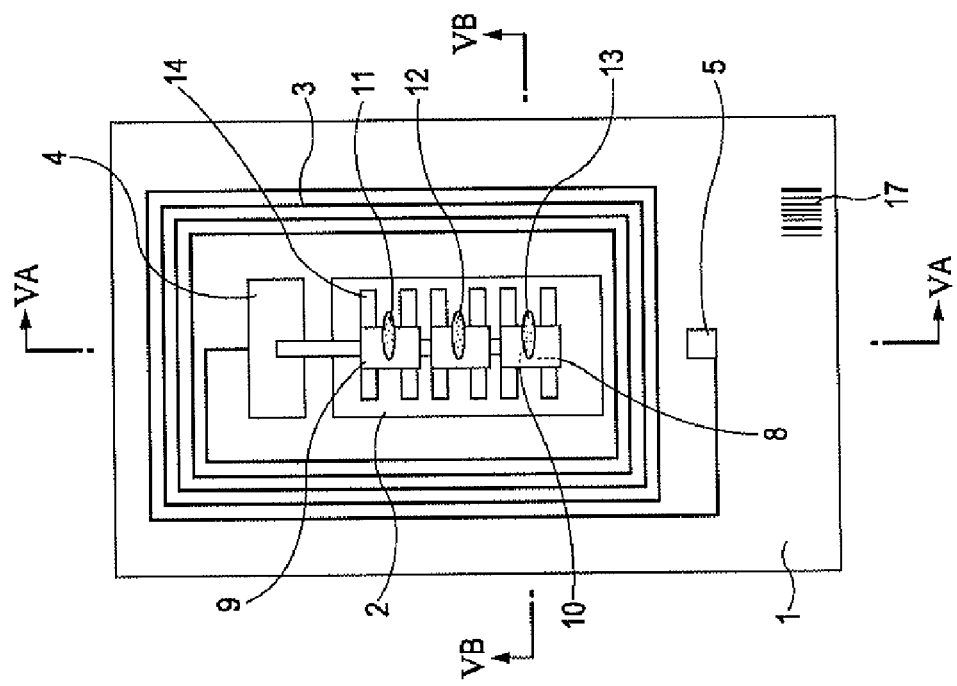

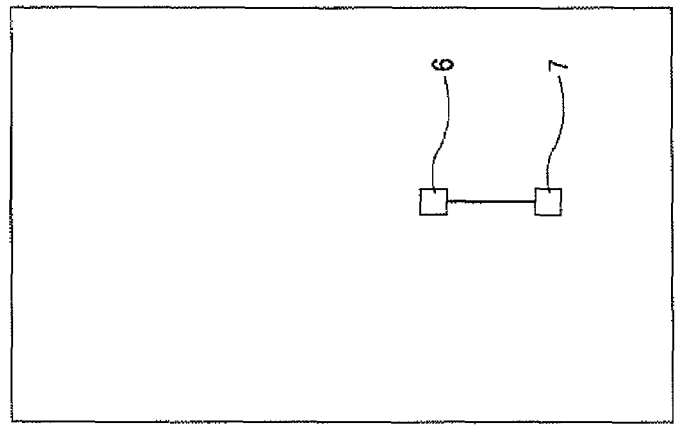
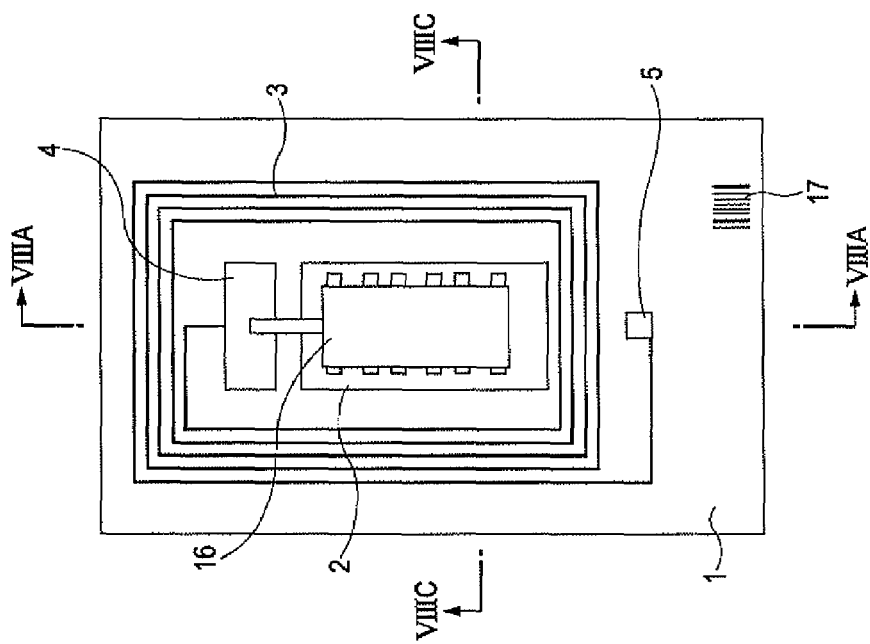

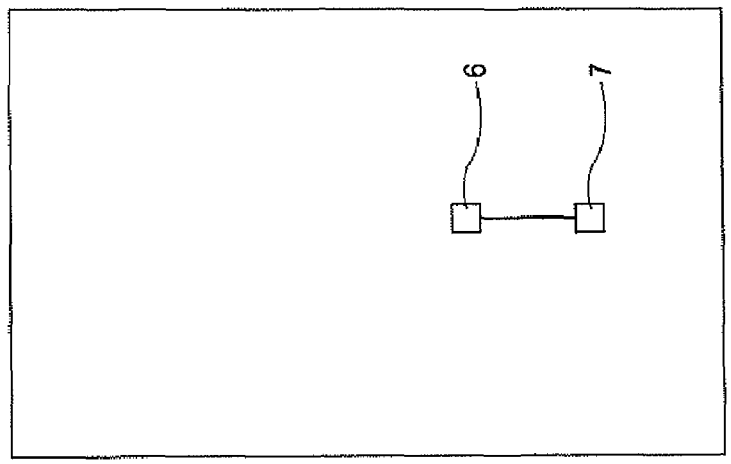
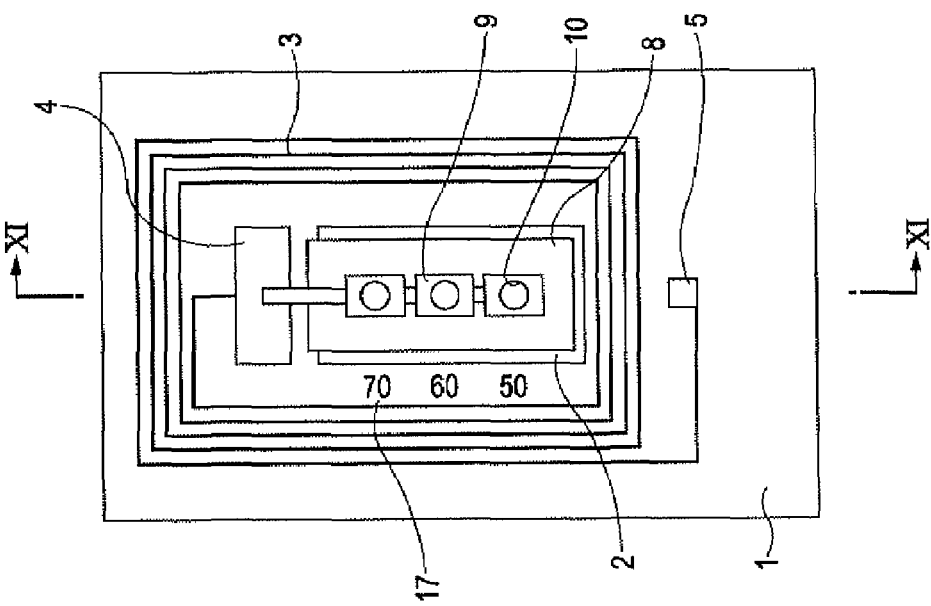

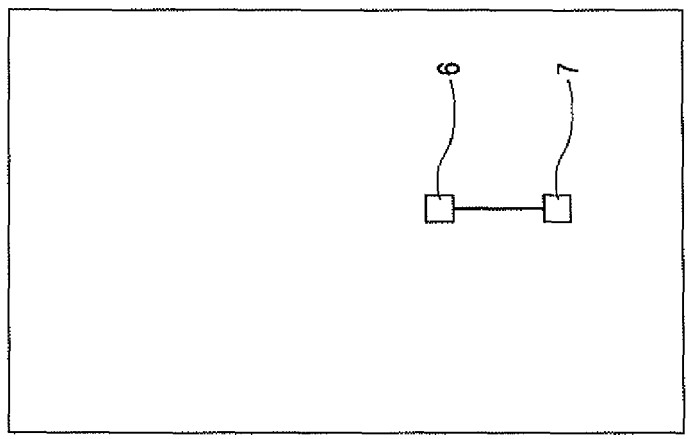
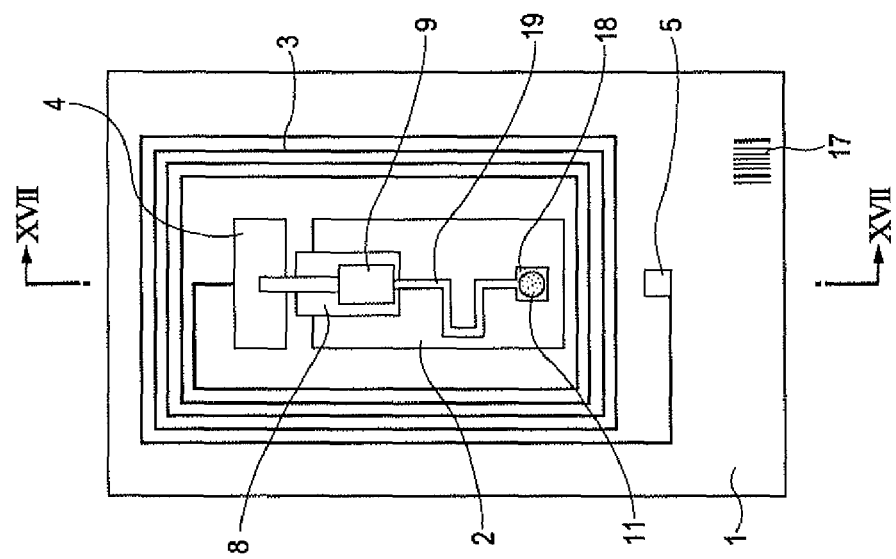

RESONANCE TAG WITH TEMPERATURE SENSOR

This application is a divisional of application Ser. No. 11/945,259, filed Nov. 26, 2007 (allowed), the contents of which are incorporated by reference herein.

BACKGROUND OF THE INVENTION

1. Field of the Invention

The present invention provides a low-cost resonance tag, which indicates the temperature history and which is a new application of a wireless tag, wherein the temperature history of a substance to be measured can easily be checked.

2. Description of the Related Art

Japanese Patent Laid-Open No. 2004-245607 discloses a temperature-history sensor having a plurality of temperature switches and LC resonance circuits, in which the value of capacitance element is switched in accordance with turning on or turning off of the temperature switch.

The temperature-history sensor described in Japanese Patent Laid-Open No. 2004-245607 can keep the temperature history stepwise and irreversibly. However, a commercially available temperature switch is used. Therefore, a temperature-history sensor suitable for selecting a set temperature more easily has been required.

Japanese Patent Laid-Open No. 2004-144683 describes a tag with a temperature sensor having a resonance circuit composed of a capacitor formed by using a material which has a dielectric constant varying in accordance with temperature changes.

However, regarding the tag with the temperature sensor described in Japanese Patent Laid-Open No. 2004-144683, the variation of the dielectric constant in accordance with the temperature change is reversible. Therefore, The history of sensed temperature change must be stored in nonvolatile memory included in the tag.

SUMMARY OF THE INVENTION

According to the present invention, a low-cost irreversible temperature-history sensor can be provided, wherein no nonvolatile memory is required and the set temperature can easily be selected.

A temperature-history sensor according to an aspect of the present invention includes a resonance circuit composed of at least a capacitor and a coil, wherein the above-described temperature-history sensor has a display for indicating a predetermined set temperature of the above-described temperature-history sensor, the above-described capacitor has at least a thermofusion material between electrodes of the above-described capacitor, and the melting point of the above-described thermofusion material is in the region of the above-described set temperature.

The region of the set temperature can be the range from a temperature 0.5° C. lower than the above-described set temperature to the set temperature.

The above-described display can indicate the above-described set temperature by an electrical method, a magnetic method, an optical method, or a method by using printing.

At least a part of the above-described thermofusion material between the above-described capacitor electrodes can flow out due to heat so as to change the resonance characteristic of the above-described resonance circuit.

A temperature-history sensor according to another aspect of the present invention includes a resonance circuit composed of at least a capacitor and a coil, wherein the above-described temperature-history sensor has a display for indicating a predetermined set temperature of the above-described temperature-history sensor and a thermofusion material, the melting point of the above-described thermofusion material is in the region of the above-described set temperature, and at least a part of the thermofusion material is fused due to heat and flows between the above-described capacitor electrodes so as to change the effective dielectric constant of the above-described capacitor.

The above-described capacitor can include a porous dielectric between the above-described capacitor electrodes.

The above-described thermofusion material can be disposed in the vicinity of the above-described capacitor electrodes.

A flow path for supplying the above-described thermofusion material can be disposed between the above-described capacitor electrodes.

A temperature-history sensor according to another aspect of the present invention includes a resonance circuit composed of at least a capacitor and a coil, wherein the above-described temperature-history sensor has a thermofusion material, and at least a part of the thermofusion material is fused due to heat and flows between the above-described capacitor electrodes so as to change the effective dielectric constant of the above-described capacitor.

Further features of the present invention will become apparent from the following description of exemplary embodiments with reference to the attached drawings.

BRIEF DESCRIPTION OF THE DRAWINGS

FIGS. 4A and 4B are external views showing an example of a resonance tag with a temperature sensor in the case where a dielectric is air.

FIGS. 7A and 7B are external views showing an example of a resonance tag with a temperature sensor in the case where thermofusion materials are disposed between electrodes in advance.

FIGS. 10A and 10B are external views showing an example of a resonance tag with a temperature sensor in the case where a dielectric is a porous material.

FIGS. 16A and 16B are external views showing an example of a resonance tag with a temperature sensor having a flow path.

DESCRIPTION OF THE EMBODIMENTS

Figure 1:
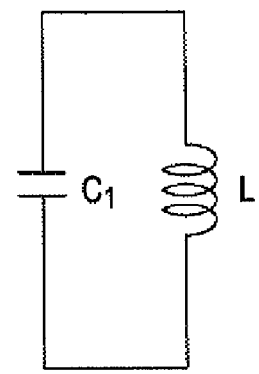
FIG. 1 is a schematic diagram (one capacitor and one coil) showing an example of an equivalent circuit of a resonance tag with a temperature sensor.

The embodiments according to the present invention will be described below with reference to the drawings. Regarding the drawings referred to explain the present invention, the same elements are indicated by the same reference numerals, and duplicate explanations thereof will not be provided.

Figure 2:
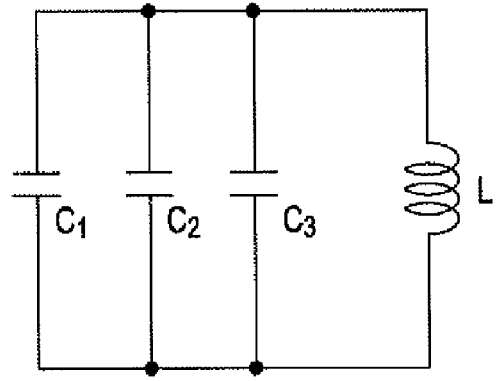
FIG. 2 is a schematic diagram (parallel connection) showing an example of an equivalent circuit of a resonance tag with a temperature sensor.
Figure 3:
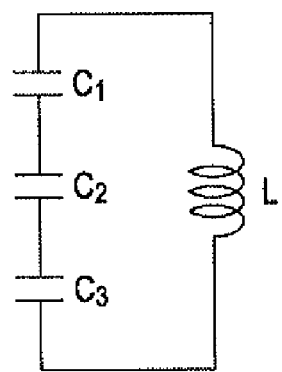
FIG. 3 is a schematic diagram (series connection) showing an example of an equivalent circuit of a resonance tag with a temperature sensor.

FIGS. 1 to 3 are schematic diagrams showing examples of tags with a temperature sensor composed of a coil and at least one capacitor. Here, L denotes a coil, and each of $C_1$ to $C_3$ denotes a capacitor.

FIG. 1 shows an equivalent circuit in which one capacitor and one coil are connected. FIG. 2 shows an equivalent circuit in which three capacitors and one coil are connected in parallel. FIG. 3 shows an equivalent circuit in which three capacitors and one coil are connected in series.

In the case where the tag includes two or more capacitors, as shown in FIGS. 2 and 3, the tag can indicate the temperature history stepwise. Furthermore, the history of specific temperature can be indicated stepwise by combining a plurality of tags, each including a capacitor having a capacitance different from each other. The temperature history is measured on the basis of a change in capacitance component or inductance of the circuit. Therefore, a stepwise temperature history can be kept in either case where the connection method of the capacitor is the series connection or the parallel connection.

The resonance tags shown in FIGS. 1 to 3 will be described in detail with reference to the following embodiments.

First Embodiment

The present embodiment relates to a temperature-history sensor in which at least a part of a thermofusion material is fused due to heat and flows between capacitor electrodes so as to change the effective dielectric constant of the capacitor.

Figure 5A:
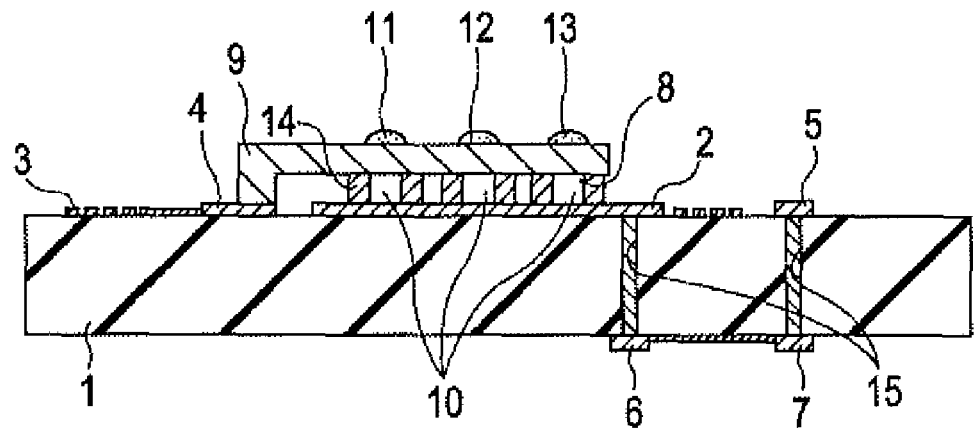
FIGS. 5A and 5B are sectional views showing an example of a resonance tag with a temperature sensor in the case where a dielectric is air.
Figure 5B:
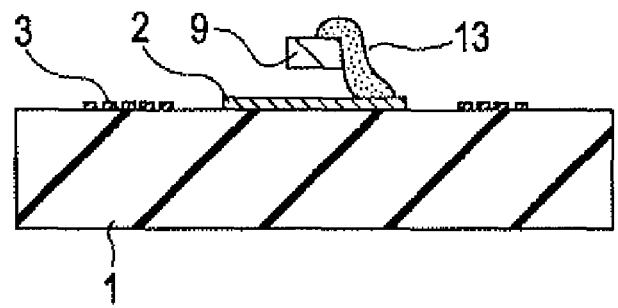

FIGS. 4A and 4B show an example of a tag with a temperature sensor of the present embodiment. FIGS. 4A and 4B are plan views of the tag. FIG. 4A is a front-side view and FIG. 4B is a back-side view. FIG. 5A is a sectional view of a section cut with a VA-VA plane shown in FIG. 4A, and FIG. 5B is a sectional view of a section cut with a VB-VB plane shown in FIG. 4A.

The tag with a temperature sensor of the present embodiment includes an insulating substrate 1, a capacitor lower electrode pattern 2 disposed on the insulating substrate 1, and an electroconductive wiring pattern 3 corresponding to a coil antenna portion, a pad portion 4, which is connected to one end of an upper electrode and which has a function of supporting the upper electrode, and a pad portion 5, which is to be connected to an electroconductive member in a via hole, at the two ends of the electroconductive wiring pattern 3. The electrode pattern 2 is electrically connected to a pad portion 6 at one end of a wiring (back-side wiring) disposed on the back-side surface of the insulating substrate 1 through the electroconductive member in the via hole 15. A pad portion 7 at the other end of the back-side wiring is electrically connected to the pad portion 5 through the electroconductive member in the via hole 15. That is, the electrode pattern 2 is electrically connected to the pad portion 5.

A dielectric material 8 is disposed on the lower electrode pattern 2 of the capacitor. Furthermore, an upper electrode 9 of the capacitor is disposed on the dielectric material 8. In the present embodiment, air is used as the dielectric material 8. Therefore, spacers 14 are disposed to keep the gap between the capacitor electrodes. For the dielectric material 8, any material can be used insofar as the material has a space into which a melt of a thermofusion material, as described later, can flow. Examples of dielectric materials include porous solid dielectric materials. In the case where a material, e.g., a solid, keeping a constant shape is used as the dielectric material, the spacer 14 need not be disposed.

The tag of the present embodiment includes the dielectric material between the electrodes, and further includes opening portions 10 to expose the dielectric material to the outside.

The positions of the opening portions can be appropriately determined in relation to the positions at which the thermofusion materials, as described later, are disposed. For example, in the case where the thermofusion material is disposed on the upper surface of the upper electrode 9, the opening portion may be disposed in such a way as to penetrate the upper electrode.

Thermofusion materials 11, 12, and 13 having different melting points are disposed in the vicinity of the opening portions 10. In Claims and specifications of the present invention, the term "vicinity" refers to a distance of 1 mm or less. When the temperature of the environment, in which the tag is placed, reaches the predetermined set temperatures of the above-described temperature-history sensor, the respective thermofusion materials 11 to 13 are fused in increasing order of melting point and are converted to melts. In the present example, these melts flow into gaps sandwiched by the spacers, the upper electrode, and the lower electrode. Consequently, the effective dielectric constant of a dielectric layer is changed, and the resonance characteristic (the capacitance or the inductance of the resonance circuit) of the tag is changed. In the present embodiment, the air is used as the dielectric material. In the case where, for example, a solid dielectric having pores is used as the dielectric material, the melt flows into the pores and, thereby, the resonance characteristic of the tag is changed.

In the present embodiment, the dielectric material 8 is required to have a space, into which the melt flows. Strictly, in the case where the air itself is used as the dielectric material, at least a part of the air is replaced with the melt. In the case where the dielectric material is a solid dielectric having a space, e.g., pores, at least a part of the air in the pores or the like is replaced with the melt. Even in the latter case, it is possible to assume that the air is also a part of the dielectric material. In either case, the space is necessary. Therefore, the dielectric material can be a solid material (solid dielectric material) having pores or be the air. Examples of such solid materials include ceramic materials, e.g., barium titanate, titanium oxide, and aluminum oxide, and resin materials, e.g., polystyrenes, polymethyl methacrylates, polyimides, polypropylenes, ABS resins, and polyphenyl sulfide resins.

For the insulating substrate 1, a resin substrate, a glass substrate, and the like can be used. Among them, the resin substrate can be low-cost and light-weight. Examples of materials for the resin substrate include polyimide resins, epoxy resins, glass fiber-reinforced epoxy resins, polyethylene terephthalate resins, polyethylene naphthalate resins, phenol resins, and acrylic resins, which are industrially used as electronic component substrates in general. Most of all, heat-resistant resins, e.g., polyimides, can be used in consideration of the probability of an occurrence of unexpected high-temperature state, from the viewpoint of the function as a temperature sensor.

The materials for the electroconductive wiring pattern 3, the lower electrode pattern 2, the upper electrode 9, the pad portions 4 to 7, the electroconductive member disposed in the via hole 15 can be materials exhibiting the electrical conductivity. For example, noble metals, e.g., gold, silver, and copper, and electroconductive polymers represented by polyanilines, polythiophenes, and polypyrroles can be used. These electroconductive members can be formed by, for example, a method by using plating or a method by using printing, e.g., a nanoimprinting method, a screen printing method, or the like.

The thermofusion materials 11 to 13 are materials having melting points in the region of the predetermined set temperatures of the above-described temperature-history sensor. Here, the region of the set temperature can be the range from a temperature 0.5° C. lower than the set temperature to the set temperature. Put another way, the melting point can be within the range of the set temperature −0.5° C. and the set temperature. For example, in the case where the set temperatures of the temperature-history sensor are A° C., B° C., and C° C., the tag includes a thermofusion material having the melting point of (A° C.-0.5° C.) or higher, and A° C. or lower, a thermofusion material having the melting point of (B° C.-0.5° C.) or higher, and B° C. or lower, and a thermofusion material having the melting point of (C° C.-0.5° C.) or higher, and C° C. or lower.

In the case where the temperature-history sensor has one set-temperature, the information whether the temperature-history sensor has experienced the temperature higher than or equal to the set temperature or not can be obtained from the temperature-history sensor. For example, in the case where the set temperature is A° C. and the melting point of the thermofusion material is A° C., it is possible to know which is the maximum value of the temperature experienced by the temperature-history sensor, A° C. or higher or lower than A° C., from the measurement results of the temperature-history sensor. In the case where the temperature-history sensor has a plurality of set temperatures, it is possible to know which is the maximum value of the temperature experienced by the temperature-history sensor, lower than the lowest set-temperature, higher than or equal to the lowest set-temperature and lower than the highest set-temperature, or higher than or equal to the highest set-temperature. Furthermore, in the case where the maximum value is a temperature between the set temperatures, it is possible to know which set temperatures, among the plurality of set temperatures, sandwich the maximum value. For example, in the case where the set temperatures are A° C., B° C., and C° C., the melting points of the thermofusion materials are A° C., B° C., and C° C., and A° C.<B° C.<C° C. is satisfied, it is possible to obtain the information regarding which is the temperature experienced by the temperature-history sensor, lower than A° C., higher than or equal to A° C. and lower than B° C., higher than or equal to B° C. and lower than C° C., or higher than or equal to C° C.

The predetermined set temperature of the above-described temperature-history sensor is indicated on a display 17 included in the temperature-history sensor. In the case where the temperature-history sensor has a plurality of set temperatures, all the set temperatures are indicated. A method for indicating the set temperature may be an indirect indication method, in which the set temperature is indicated by some type of operation, or a method, in which the set temperature is directly indicated by, for example, a method by using printing, without the need for operation. Examples of methods for indirectly indicating the set temperature include a method in which the information regarding the set temperature is given to a memory device included in the above-described temperature-history sensor, and the information is read by using an electrical method, a magnetic method, or an optical method so as to indicate the set temperature. The case where the information, e.g., a type number, which indicates the type of tag, is given to the tag, and the above-described type number is checked against another information regarding the correlation between the type number and the set temperature so as to get the set temperature from the type number, is also included in the case where the information regarding the set temperature is given to the display. It is also possible that the tag has another resonance circuit, the resonance characteristic of the resonance circuit indicates the type number of the tag, and the set temperature is indicated by using the type number, as described above. Devices, e.g., bar codes and two-dimensional bar codes, in which paper is generally used as a base material, are included in the memory devices. The method by using printing is a method in which the set temperature is printed by using letters or symbols in such a way that the set temperature can be visually checked. For example, in the case where the set temperatures of the temperature-history sensor are A° C., B° C., and C° C., the set temperatures can be expressed as A-B-C. These displays may be disposed in the temperature-history sensors. In other embodiments, the displays can be disposed separately from the temperature-history sensor, insofar as it can be recognized that the display indicates the set temperature of the above-described temperature-history sensor.

The display can indicate information other than the set temperature, besides the set temperature.

For the thermofusion materials 11 to 13, for example, petroleum wax and synthetic wax, e.g., paraffin wax and polyolefin-based wax, thermoplastic resins, e.g., polystyrenes, methacrylic resins, and polyethylenes, and natural fats and oils, e.g., animal fats and oils, can be used. Here, the thermofusion material refers to a material which is fused due to heat so as to change from a solid state to a liquid state.

The spacer 14 having a thickness suitable for forming a gap can be used, and resin films, adhesive films, and the like can be used therefor. The thickness of the spacer is adjusted in accordance with the amount of capacitance required of the capacitor.

A method for forming a tag and a method for measurement will be described below in detail with reference to specific examples.

A polyimide substrate is used as the insulating substrate 1, the electroconductive wiring pattern 3, the pad portions, and the via holes 15 are formed from copper on the above-described insulating substrate 1 by a photolitho process and laser drilling. Film type hot melt adhesives (adhesion temperature 140° C. to 160° C.) are placed in parallel on the lower electrode 2 and are dried, so as to form spacers having a film thickness of 75 μm. In this case, air is used as the dielectric material, and the gaps between the spacers are used as-is. The capacitor upper electrode 9 separately formed by metal working is fixed to the lower electrode 2 with spacers therebetween so as to form a resonance tag. Regarding the resonance tag, a paraffin wax piece 120P having a melting point of 50° C. and serving as the thermofusion material 11, a paraffin wax piece 135P having a melting point of 60° C. and serving as the thermofusion material 12, and a paraffin wax piece 155P having a melting point of 70° C. and serving as the thermofusion material 13 are set in the vicinity of three respective openings 10, so that a temperature-history sensor having set temperatures of 50° C., 60° C., and 70° C. is prepared. The set temperatures are recorded as a bar code 17 included in the temperature-history sensor, and the set temperatures can be checked by indicating the information of the bar.

This temperature-history sensor is placed on a hot plate, and the resonance characteristic of the resonance tag included in the temperature-history sensor is measured after changing the temperature. The resonance characteristic is measured after the tag and the hot plate heating surface reach the thermal equilibrium state sufficiently. Therefore, heating is performed up to a predetermined temperature, the temperature is kept for 1 hour, and cooling is performed to room temperature. Thereafter, the measurement is performed.

Figure 6:
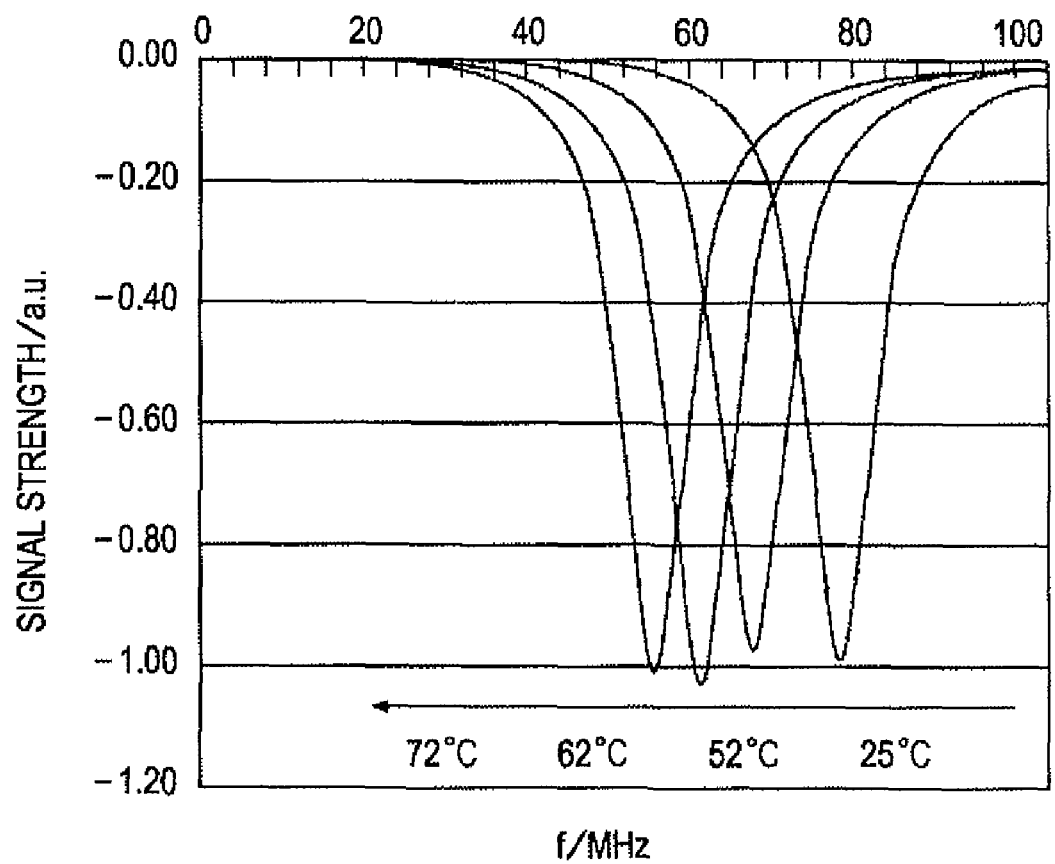
FIG. 6 is a diagram showing a resonance characteristic after a heat treatment of a tag with a temperature sensor in the case where a dielectric is air.

FIG. 6 shows the measurement results of the resonance characteristic of the tag in the case where the temperature of the hot plate is set at 25° C. (room temperature, initial state), 52° C., 62° C., and 72° C. The evaluation of the resonance characteristic of the tag can be performed by using a network analyzer (trade name HP8753E) produced by Hewlett-Packard Company. Here, the resonance characteristic refers to a resonance frequency of a resonance peak of the tag or the amplitude and the Q value attributed to the peak. Practically, the resonance frequency is easily identified and, therefore, can be used for evaluating the resonance characteristic.

The resonance frequencies at the individual temperatures are 75.6 MHz at 25° C., 65.5 MHz at 52° C., 58.5 MHz at 62° C., and 53.4 MHz at 72° C. The resonance frequency shifts to the lower-frequency side as the heating temperature increases. The resonance frequencies at the above-described individual temperatures are taken as reference values and, thereby, an unknown temperature experienced by the tag can be calculated from the frequency of the tag. That is, when the resonance frequency is 75.6 MHz, the temperature experienced by the tag is estimated to be lower than 50° C. When the resonance frequency is 65.5 MHz, the temperature is estimated to be 50° C. or higher, and lower than 60° C. When the resonance frequency is 58.5 MHz, the temperature is estimated to be 60° C. or higher, and lower than 70° C. When the resonance frequency is 53.4 MHz, the temperature is estimated to be 70° C. or higher. Such information of the reference values is given to the tag by a technique similar to that in the case where the information regarding the set temperatures of the tag is directly or indirectly indicated.

It can be observed that the paraffin wax pieces set in the vicinity of the opening portions of the upper electrode before heating have spread into the inside of the openings 10 after being heated to respective temperatures. It is believed that the paraffin wax serving as the thermofusion material reaches the melting point so as to fuse and flow into the gap portion between the capacitor electrodes by a capillary force. Since the paraffin wax flows into the gap portion, the effective dielectric constant increases, so that the resonance peak shifts to the low-frequency side.

As described above, the fusion of the paraffin wax can also be checked visually. Therefore, the history of the temperature detected by the above-described resonance frequency can easily be checked visually as well. The principle is the inflow of the melt. Therefore, in the case where detection of the fact that solid-liquid transfer has occurred by a fusion phenomenon due to heating, rather than detailed temperature information, is good enough for the user, the fact can be easily known by using the similar configuration through visual check and the frequency shift. Since fine adjustments of the range of measurable temperature history can also be made by, for example, mixing at least two types of dielectric, the versatility is higher than that in the case where a temperature fuse, which goes into action merely at a predetermined temperature, is incorporated.

Second Embodiment

The present embodiment relates to a temperature-history sensor in which at least a thermofusion material is included between capacitors, and the thermofusion material between capacitor electrodes flows out due to heat so as to change the effective dielectric constant of the capacitor.

Figure 8A:
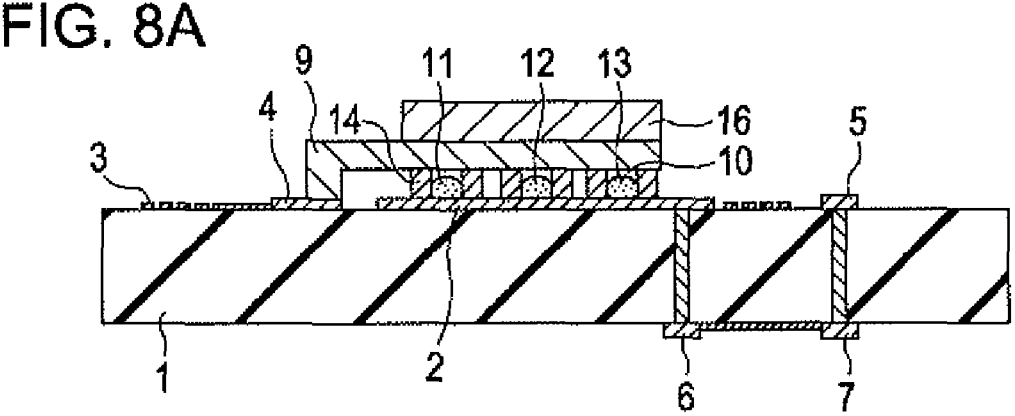
FIGS. 8A to 8D are sectional views showing an example of a resonance tag with a temperature sensor in the case where thermofusion materials are disposed between electrodes in advance.
Figure 8B:
Figure 8C:
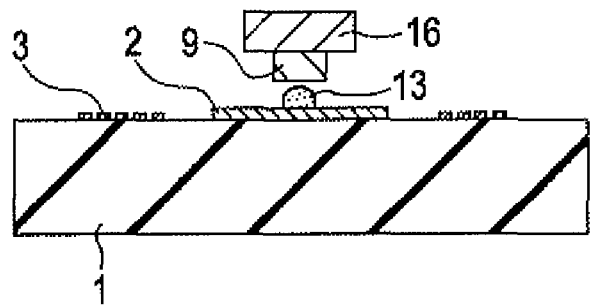

FIGS. 7A and 7B and FIGS. 8A to 8D show a temperature-history sensor of the present embodiment. FIGS. 7A and 7B are plan views of the tag. FIG. 7A shows a front-side view and FIG. 7B shows a back-side view. FIG. 8A is a sectional view of a section cut with a VIIIA-VIIIA plane shown in FIG. 7A, FIG. 5B is a diagram of a shielding member 16 viewed from above, and FIG. 8C is a sectional view of a section of the tag cut with a VIIIC-VIIIC plane shown in FIG. 7A.

Figure 8D:
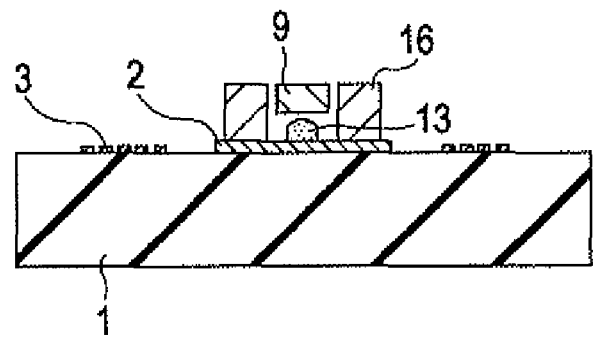

The tag is formed as in the first embodiment, except that the thermofusion materials 11 to 13 are not disposed in the vicinity of the openings but are disposed as the dielectric materials between the capacitor electrodes and that a piece of normal paper (shielding member 16) for absorbing the thermofusion material, which are disposed between the electrodes and which flow out due to fusion, is disposed in the vicinity of the openings. Consequently, in the present embodiment, for example, the material described as the thermofusion material in the first embodiment can be used for the dielectric material. In FIG. 8C, a piece of paper is disposed on the upper electrode 9. However, the piece of paper, or other such material, may be disposed at a position other than the above-described position insofar as the piece of paper can be disposed in the vicinity of the opening portions. For example, as shown in FIG. 8D, the normal paper may be disposed in the flow direction of the thermofusion material due to fusion.

The temperature is changed in a manner similar to that in the first embodiment, and the resonance characteristic of the resonance tag at each temperature is measured. The thermofusion material, which is disposed between the capacitor electrodes and which is fused due to change of temperature, flows out, and is absorbed by the piece of paper disposed in the vicinity of the opening portion. Consequently, the resonance characteristic of the resonance tag included in the temperature-history sensor is changed.

Figure 9:
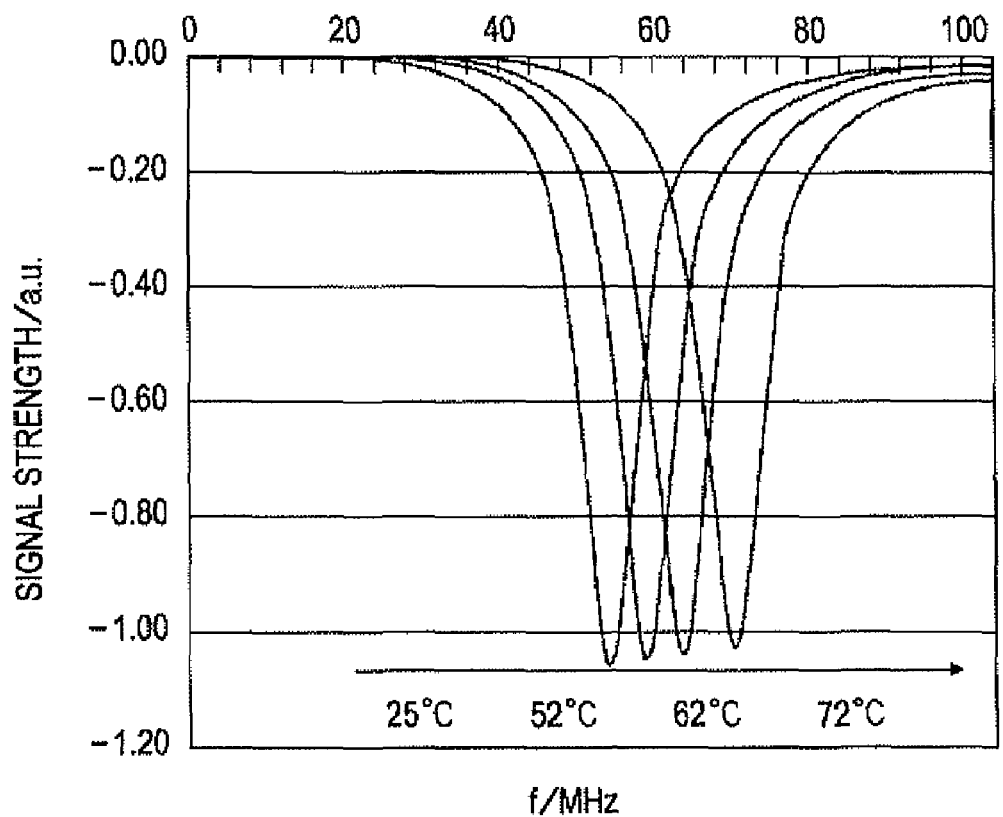
FIG. 9 is a diagram showing a resonance characteristic of a tag with a temperature-history sensor in the case where thermofusion materials are disposed between electrodes in advance.

FIG. 9 shows the measurement results of the resonance characteristic of the tag in the case where the temperature of the hot plate is set at 25° C. (room temperature, initial state), 52° C., 62° C., and 72° C.

In contrast to the first embodiment, the resonance frequency shifts to the higher-frequency side as a higher temperature is experienced by the tag. The reason for this is believed to be that a larger amount of the thermofusion material flows out as the temperature increases, so as to decrease the effective dielectric constant of the capacitor.

Third Embodiment

Figure 11:
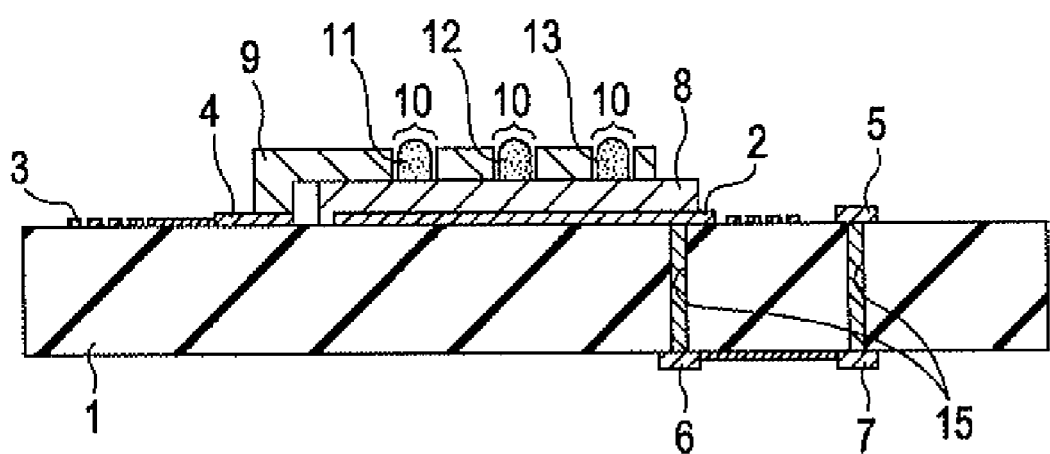
FIG. 11 is a sectional view showing an example of a resonance tag with a temperature sensor in the case where a dielectric is a porous material.

In the third embodiment, a resonance tag as shown in FIGS. 10A and 10B and FIG. 11 is formed. FIGS. 10A and 10B are plan views of the tag. FIG. 10A shows a front-side view and FIG. 10B shows a back-side view. FIG. 11 is a sectional view of a section cut with a XI-XI plane shown in FIG. 10A. A polyimide substrate is used as the insulating substrate 1, a copper pattern is used as the electroconductive wiring pattern 3, and a porous titanium oxide film (film thickness 10 μm) formed from titanium oxide paste is used as the dielectric material 8. As in the first embodiment, the electroconductive wiring pattern 3, the lower electrode 2, the pad portion 4, the dielectric film 8, the upper electrode 9 having the opening portions 10 are formed on the insulating substrate 1. Pad portions 5 to 7 are formed on the insulating substrate 1. The porous dielectric film 8 is also formed on the lower electrode. The thermofusion materials 11 to 13 are disposed in the opening portions 10.

The porous dielectric film, which is the dielectric material 8, is formed as described below. Titanium oxide is put into water and nitric acid is added thereto. The resulting mixed solution is treated with a planetary mill so as to prepare a dispersion of titanium oxide. In order to improve variations in coating, polyethylene glycol (PEG, molecular weight 20,000) is added to the dispersion of titanium oxide, so that a titanium oxide paste is prepared. The resulting titanium oxide paste is applied to the lower electrode 2 by a doctor blade method, heating and drying is performed at 250° C. in an electric furnace, so as to produce a titanium oxide film serving as the porous dielectric film. The film thickness of the titanium oxide film measured with a probe film thickness gauge at this time is 10 μm. In the present invention, the porous dielectric refers to a dielectric having many pores and exhibiting the porosity of 30% or more. Examples of such a porous dielectric include zirconia oxide, aluminum oxide, and barium titanate, besides the above-described titanium oxide. A resonance tag having a desired resonance frequency can be produced by using a porous dielectric film having the dielectric constant suitable for the desired resonance frequency as the dielectric material 8. The upper electrode 9 of the capacitor is formed by screen printing a silver paste on a pattern having the opening portions 10 and, thereafter, performing a heat treatment at 200° C. Subsequently, paraffin wax pieces 120P, 135P, and 155P having the melting points of 50° C., 60° C., and 70° C., respectively, are set as the thermofusion materials in three respective opening portions 10, and are fixed with a Kapton® tape (not shown in the drawing) from above, so as to produce a resonance tag. As in the first embodiment, the set temperatures of the present embodiment are 50° C., 60° C., and 70° C., and as shown in FIG. 10A, the set temperatures are indicated as 50, 60, and 70 on a set temperature printing portion included in the temperature-history sensor.

This resonance tag is placed on a hot plate, and the resonance characteristic of the resonance tag at each temperature is measured after sequentially changing the temperature to 52° C., 62° C., and 72° C. The resonance characteristic is measured after the tag and the hot plate heating surface reach the thermal equilibrium state sufficiently. Therefore, heating is performed up to a predetermined temperature, the temperature is kept for 1 hour, and cooling is performed to room temperature. Thereafter, the measurement is performed.

Figure 12:
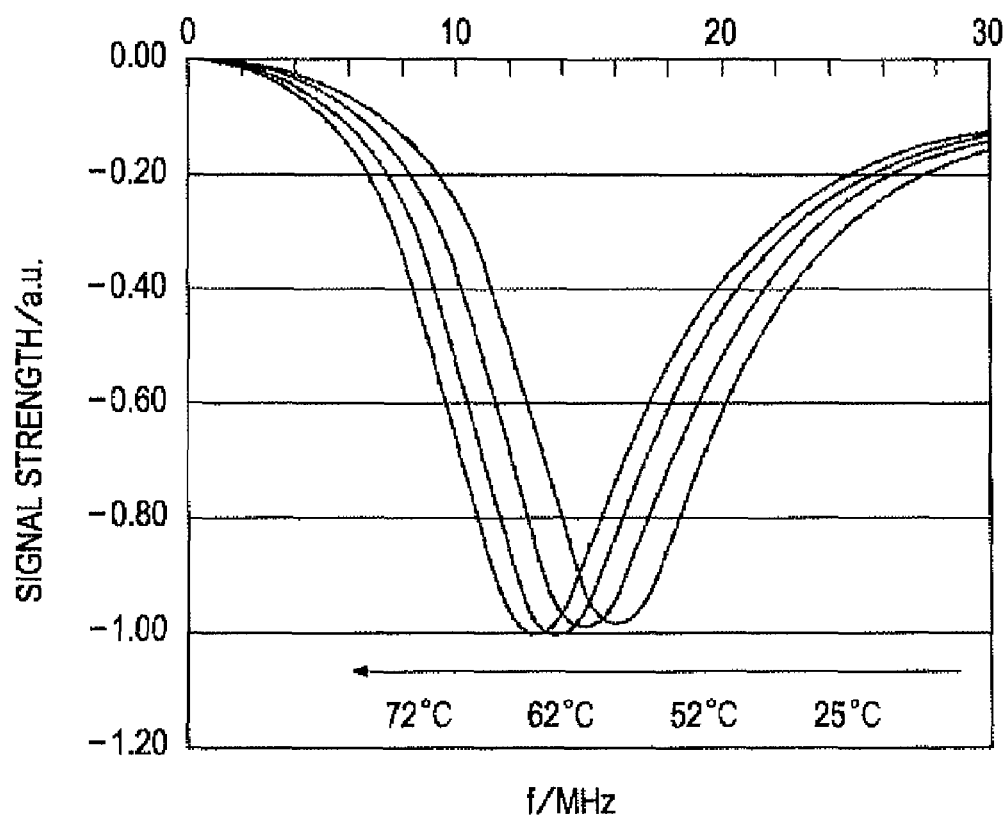
FIG. 12 is a diagram showing a resonance characteristic after a heat treatment of a tag with a temperature sensor in the case where a dielectric is a titanium oxide film.

FIG. 12 shows the measurement results of the resonance characteristic where the temperature is changed. The resonance frequency result is 15.3 MHz at room temperature, 25° C., in the initial state, 14.6 MHz at 52° C., 13.6 MHz at 62° C., and 12.8 MHz at 72° C. Therefore, as in the first embodiment, it is observed that the resonance frequency of the tag experienced a higher-temperature environment shifts to the lower-frequency side. It can be observed that all of three paraffin wax pieces set in the opening portions 10 of the upper electrode 9 before heating have spread due to fusion. As is clear from this, when the heating temperature reaches the melting point of each paraffin wax, the paraffin wax is heat-fused so as to flow into the porous titanium oxide film from the opening portion. Since the paraffin wax flows into the porous titanium oxide film, the effective dielectric constant increases, so that the resonance frequency shifts to the low-frequency side.

As in the first embodiment, it is possible to measure an unknown temperature, which has been experienced by the tag, by using these measurement values as reference values.

For the dielectric film, porous titanium oxide film subjected to a lipophilicity-imparting surface treatment may be used as the dielectric film. The heat-fused paraffin can flow into the porous titanium oxide film more speedily by subjecting the porous titanium oxide film to the lipophilicity-imparting treatment. Examples of such lipophilicity-imparting treatments include a method in which a silane coupling agent solution is dropped to the opening portion of the tag including the porous titanium oxide film, washing is performed with water, and heating is performed at 110° C. to remove water, so that the lipophilicity-imparting treatment of the porous titanium oxide film is performed.

Fourth Embodiment

A resonance tag is produced as in the third embodiment, except that a polystyrene film is used as the dielectric material 8 and for the upper electrode, copper foil is cut and stuck on the polystyrene film.

The polystyrene film is formed by applying polystyrene fine particles synthesized from a styrene monomer by a suspension polymerization method and performing heat-drying at 70° C. It is checked by measurement with a probe film thickness gauge that the film thickness of the porous polystyrene film is 10 μm. The capacitor upper electrode 9 is produced by sticking copper foil, which has been cut with a pattern having opening portions, on the polystyrene film. Paraffin wax pieces 120P, 135P, and 155P having the melting points of 50° C., 60° C., and 70°C., respectively, are set as the thermofusion materials in three respective opening portions, and are fixed with a Kapton® tape from above, so as to produce a resonance tag. Thereafter, the measurement is performed under the heat-measurement condition similar to that in the first embodiment.

Figure 13:
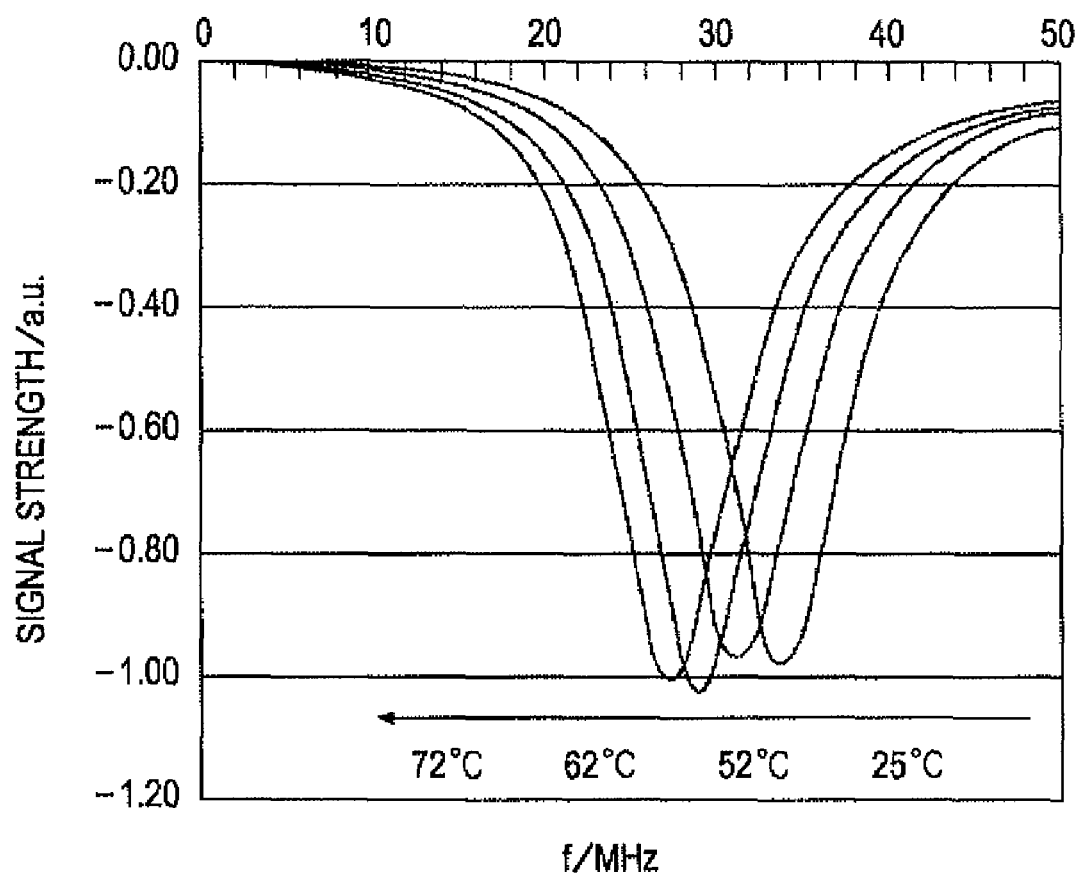
FIG. 13 is a diagram showing a resonance characteristic after a heat treatment of a tag with a temperature sensor in the case where a dielectric is a polystyrene film.

FIG. 13 shows the measurement results of the resonance characteristic in the case where the temperature of the hot plate is increased from room temperature, 25° C., to 52° C., 62° C., and 72° C. As a higher temperature is experienced, the resonance frequency shifts from 33.6 MHz at room temperature, 25° C., in the initial state to the lower-frequency side, 31.0 MHz, 28.9 MHz, and 27.2 MHz. In the present embodiment, as in the first embodiment, the resulting relationship between the temperature and the resonance frequency is taken as the reference value and, thereby, it is possible to calculate an unknown temperature, which has been experienced by the tag, from the resonance frequency. The resonance frequencies are higher than those in the case where titanium oxide is used as the dielectric material. This is because the relative dielectric constant of the porous polystyrene film is lower than that of titanium oxide. In this manner, the peak wavelength of the resonance characteristic can be appropriately selected in accordance with the material to be used.

Fifth Embodiment

FIGS. 14A and 14B and FIGS. 15A and 15B show a tag of the present embodiment.

Figure 14B:
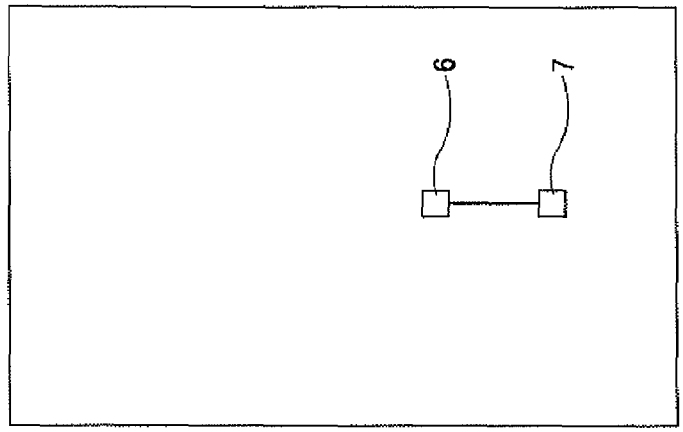
FIGS. 14A and 14B are plan views showing an example of a tag with a function to visually recognize a temperature.
Figure 14A:
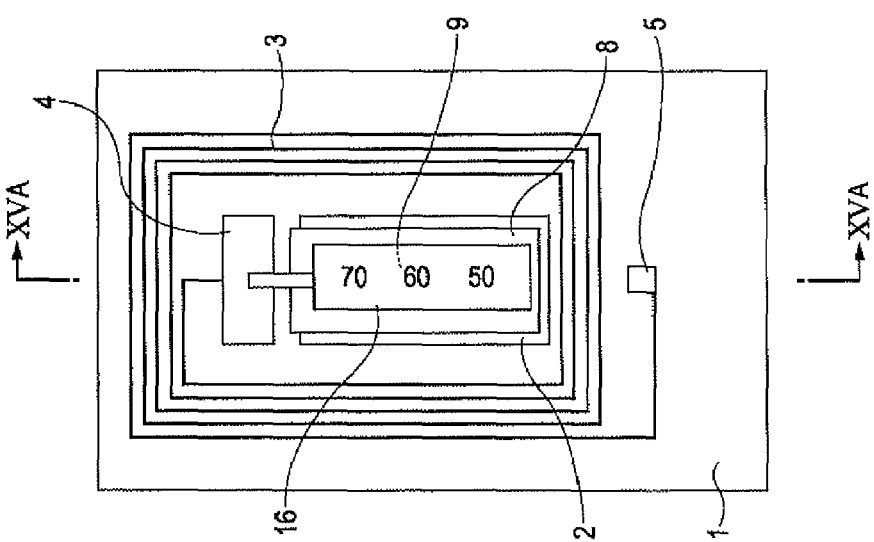
Figure 15A:
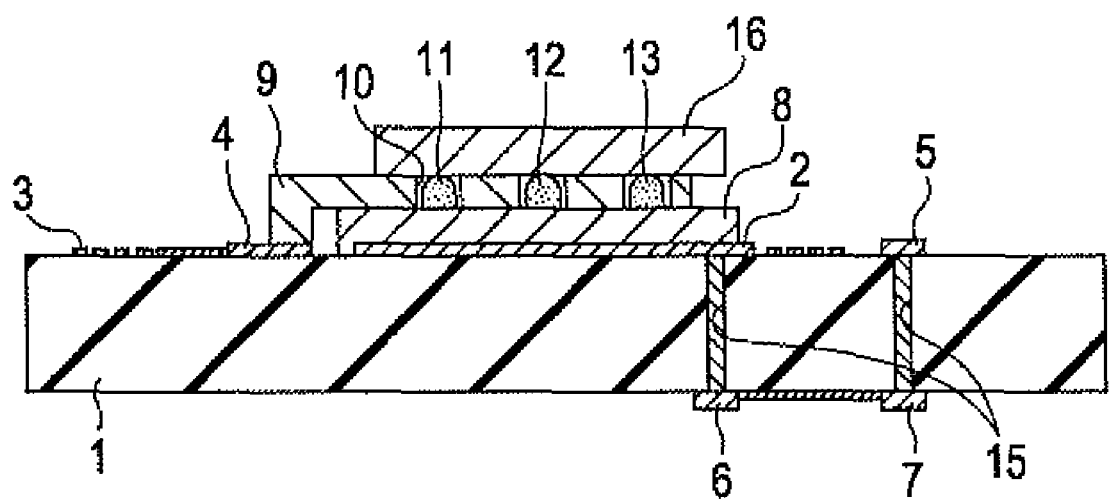
FIGS. 15A and 15B are sectional views showing an example of a tag with a function to visually recognize a temperature.

FIGS. 14A and 14B are plan views of the tag. FIG. 14A is a front-side view and FIG. 14B is a back-side view. FIG. 15A is a sectional view of a section cut with a XVA-XVA plane shown in FIG. 14A.

Figure 15B:
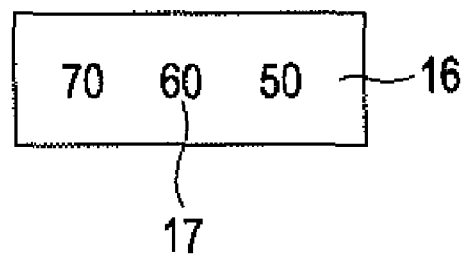

A resonance tag is produced as in the third embodiment, except that normal paper (shielding member) 16 printed with the set temperatures, as shown in FIG. 15B, is disposed on the upper electrode and on paraffin wax pieces as shown in the sectional view of FIG. 15A.

When a heating experiment similar to that in the third embodiment is performed, as in the third embodiment, a melt flows into the porous film as the temperature increases. Therefore, the shift of the resonance frequency can be checked. The melt also flows into the normal paper covering the upper surface of the paraffin wax, and the manner of solidification can be observed after cooling is performed to room temperature. That is, it becomes possible to easily perform visual check in combination with the temperature history detection based on the frequency shift of the resonance peak by using a wireless system. At this time, each set temperature may be printed in the vicinity of the thermofusion material having the melting point equal to the set temperature in such a way that an experienced temperature can be recognized. In such a case, for example, as shown in FIG. 14A, the number "70" is inscribed in the vicinity of the thermofusion material having the melting point of 70° C. In the case where the information regarding the thermofusion materials and their melting points is separately provided, the temperature history can be visually recognized by checking the visual information against the above-described information without printing the melting point in the vicinity of the thermofusion material.

In the present embodiment, as in the first embodiment, the resulting relationship between the temperature and the resonance frequency is taken as the reference value and, thereby, it is possible to calculate an unknown temperature, which has been experienced by the tag, from the resonance frequency. The visual recognition is facilitated by using colored paraffin wax, which is prepared in advance by dissolving or dispersing fat dye or pigment into the paraffin wax to be used.

Sixth Embodiment

Figure 17:
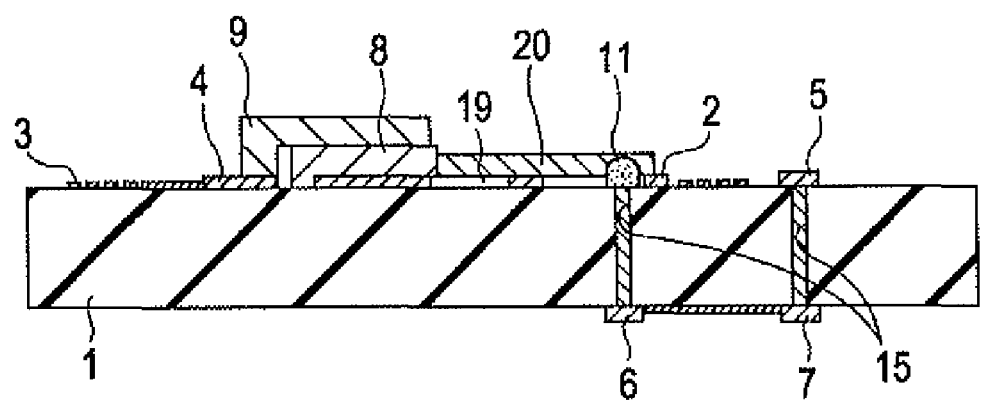
FIG. 17 is a sectional view showing an example of a resonance tag with a temperature sensor having a flow path.

A temperature-history sensor is formed in a manner similar to that in the third embodiment, except that a reservoir for stocking the fused material and a flow path are formed. FIGS. 16A and 16B are plan views of the tag. FIG. 16A is a front-side view. FIG. 17 is a sectional view of a section cut with a XVII-XVII plane shown in FIG. 16A. In the present embodiment, the structure, in which the opening portions are disposed in the electrode and the thermofusion materials are disposed therein, is not adopted in contrast to the third embodiment. Instead, the thermofusion material 11 is disposed in a reservoir 18 of a flow path 19 connected to the dielectric material 8. In particular, the reservoir 18 is positioned at the end of the flow path 19. The flow path 19 and the reservoir 18 may be patterned in advance during the formation of a copper pattern. At this time, the portion, from which copper has been removed, becomes the flow path and the reservoir portion, and the thickness of the copper foil (here, thickness is 35 μm) corresponds to the depth. A piece of paraffin wax 120P having a melting point of 50° C. is set as the thermofusion material 11 in the reservoir portion, and is fixed with a Kapton® tape 20 from above the thermofusion material 11 in such a way that the flow path 19 and the reservoir 18 are also covered, so as to produce a resonance tag. The flow path and the reservoir may be formed by a method other than the method in which a copper pattern is patterned in advance.

For example, in a method referred to as nanoimprint, a mold having a fine uneven pattern is pressed against a resin and, thereby, a micro flow path can be formed. A resin provided with such a groove may be used as an alternative to the flow path. Here, the explanation is made with reference to the example in which the porous film is used. However, the first embodiment, in which the gap portions are used, may be applied, as a matter of course.

This resonance tag is placed on a hot plate, and the resonance characteristic of the resonance tag is measured while the temperature is changed. Heating is performed up to 50° C. and, thereafter the resonance characteristic with the passage of time is measured. Regarding the flow path, a flow path A having a length of 1 cm and a flow path B having a length of 2 cm are prepared. The results are shown in Table 1.

When the heating is performed at 50° C., the resonance frequency stays at the initial stage of 15.3 MHz. However, the resonance frequency shifts to 12.9 MHz, that is, the low-frequency side, after 30 seconds have elapsed in the case where the flow path A is used, or after 50 seconds have elapsed in the case where the flow path B is used. This depends on the time elapsed before the fused paraffin comes into contact with the porous titanium oxide thin film portion. Since a capacitance change occurs only after the tag has experienced a specific temperature for a specific time, the time elapsed before the frequency change can be adjusted by the length or the depth of the flow path. Therefore, the information regarding the time, whether the tag has experienced the specific temperature for at least the specific time or not, can be obtained by forming a flow path for supplying the above-described thermofusion material between the capacitor electrodes, in addition to the information, whether a specific temperature has been experienced or not, as in the case where a simple thermal-fuse-switch or the like is used.

TABLE 1

| Time/sec | Flow path A | Flow path B |
| --- | --- | --- |
| 0 | 15.3 | 15.3 |
| 10 | 15.3 | 15.3 |
| 20 | 15.3 | 15.3 |
| 30 | 12.9 | 15.3 |
| 40 | 12.9 | 15.3 |
| 50 | 12.9 | 12.9 |
| 60 | 12.9 | 12.9 |

While the present invention has been described with reference to exemplary embodiments, it is to be understood that the invention is not limited to the disclosed exemplary embodiments. The scope of the following claims is to be accorded the broadest reasonable interpretation so as to encompass all modifications, equivalent structures and functions.

This application claims the benefit of Japanese Application No. 2006329620 filed Dec. 6, 2006, which is hereby incorporated by reference herein in its entirety.

What is claimed is:

1. A temperature-history sensor comprising:
   a resonance circuit comprising:
      a coil;
      a first capacitor; and
      a second capacitor,
   wherein a change of an effective dielectric constant of each of the first capacitor and the second capacitor changes a resonance characteristic of the resonance circuit, wherein each of the first capacitor and the second capacitor includes a pair of electrodes, wherein the electrodes of each pair face each other and are separate from each other via a gap, wherein a first material becomes fluidized at a first temperature and moves into the gap or outside of the gap of the first capacitor, so that the effective dielectric constant of the first capacitor is changed, and as a result, the resonance circuit has a first resonance characteristic, and wherein a second material becomes fluidized at a second temperature which is higher than the first temperature and moves into the gap or outside of the gap of the second capacitor, so that the effective dielectric constant of the second capacitor is changed, and as a result, the resonance circuit has a second resonance characteristic.

* * * * *